(12) United States Patent
Adkins et al.

(10) Patent No.: US 7,160,975 B2
(45) Date of Patent: Jan. 9, 2007

(54) METHACRYLATES AS STABILIZERS FOR POLYMER POLYOLS

(75) Inventors: Rick L. Adkins, Hurricane, WV (US); Scott A. Guelcher, Weirton, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 233 days.

(21) Appl. No.: 10/909,476

(22) Filed: Aug. 2, 2004

(65) Prior Publication Data

US 2006/0025558 A1    Feb. 2, 2006

(51) Int. Cl.
*C08G 18/62*    (2006.01)

(52) U.S. Cl. .................. 528/75; 521/137; 525/123; 252/182.18; 524/769

(58) Field of Classification Search .............. 528/75; 521/137; 525/123; 252/182.18; 524/769
See application file for complete search history.

(56) References Cited

U.S. PATENT DOCUMENTS

| | | | |
|---|---|---|---|
| 4,242,249 A | 12/1980 | Van Cleve et al. | 260/33.2 R |
| 4,394,491 A | 7/1983 | Hoffman | 525/452 |
| 4,477,603 A | 10/1984 | Fisk | 521/137 |
| 4,493,908 A | 1/1985 | Fisk | 521/137 |
| 4,500,675 A | 2/1985 | Fisk | 524/762 |
| 4,513,124 A | 4/1985 | Hoffman | 525/452 |
| 4,588,830 A | 5/1986 | Fisk et al. | 556/52 |
| 4,640,935 A | 2/1987 | Fisk et al. | 521/137 |
| 4,663,475 A | 5/1987 | Fisk | 560/137 |
| 4,680,358 A | 7/1987 | Yu | 526/292.9 |
| 4,723,026 A | 2/1988 | Cloetens et al. | 556/444 |
| 4,831,076 A | 5/1989 | Lidy et al. | 524/701 |
| 4,883,832 A | 11/1989 | Cloetens et al. | 524/265 |
| 5,196,476 A | 3/1993 | Simroth | 524/769 |
| 5,814,699 A | 9/1998 | Kratz et al. | 525/53 |
| 5,854,386 A | 12/1998 | Shen et al. | 528/403 |
| 5,990,185 A | 11/1999 | Fogg | 521/112 |
| 6,013,731 A | 1/2000 | Holeschovsky et al. | 525/123 |

FOREIGN PATENT DOCUMENTS

EP    786 480    7/2003

*Primary Examiner*—Rachel Gorr
(74) *Attorney, Agent, or Firm*—Joseph C. Gil; N. Denise Brown

(57) ABSTRACT

This invention relates to ethylenically unsaturated macromers which contain reactive unsaturation, and to a process for preparing these ethylenicallly unsaturated macromers which contain reactive unsaturation. The process of preparing these ethylenically unsaturated macromers comprises reacting a monofunctional compound which corresponds to a specific formula with at least one alkylene oxide, in the presence of at least one alkoxylation catalyst. The ethylenically unsaturated macromers correspond to the formula set forth herein. This invention also relates to preformed stabilizers comprising ethylenically unsaturated macromers, to a process for preparing these preformed stabilizers, to polymer polyols comprising these preformed stabilizers, and to a process of preparing these polymer polyols which comprise these preformed stabilizers. Polymer polyols comprising ethylenically unsaturated macromers and a process for their preparation are also described.

45 Claims, No Drawings

METHACRYLATES AS STABILIZERS FOR POLYMER POLYOLS

BACKGROUND OF THE INVENTION

The present invention relates to macromers based on methacrylates which correspond to a specific structure that are useful for forming preformed stabilizers which can be used to prepare polymer polyols. In addition, this invention also relates to a process for the preparation of a macromers based on methacrylates that is useful for stabilizing polymer polyols, to novel preformed stabilizers comprising these macromers, to a process for the preparation of these preformed stabilizers comprising these novel macromers, to a process for the preparation of polymer polyols comprising the novel preformed stabilizers, to polymer polyols comprising these novel preformed stabilizers, to a process for the preparation of polymer polyols comprising the ethylenically unsaturated macromers, and to polymer polyols comprises these novel ethylenically unsaturated macromers.

Polymer polyols, also known as filled polyols, are viscous fluids comprising fine particles dispersed in polyols. Examples of solids used include styrene-acrylonitrile co-polymers and polyureas. The solids are typically prepared by in situ polymerization of monomers in the base polyol. Polymer polyols are commonly used for the production of polyurethane foams.

In the present specification, a macromer is defined as a molecule which comprises one or more polymerizable double bonds and one or more hydroxyl-terminated polyether tails. Various macromers are known and have previously been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive van der Waals forces between particles. This phenomenon is known as steric stabilization. In order to form a brush layer which effectively screens van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

A number of methods for inducing reactive unsaturation into a polyol, thereby forming a macromer, are known in the art. U.S. Pat. No. 6,013,731 teaches several techniques, including reaction of a polyol with unsaturated isocyanates (such as isocyanatoethylmethacrylate (IEM) or α,α-dimethyl metaisopropenyl benzylisocyanate (i.e. TMI)), or reaction of a polyol with maleic acid or maleic anhydride, followed by isomerization of the maleate bond to the more reactive fumarate bond. A macromer prepared by transesterification of a vinylalkoxy silane with a polyol has been disclosed in EP 0,162,589.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.).

A pre-formed stabilizer (PFS) is particularly useful for preparing a polymer polyol having a lower viscosity at a high solids content. In the pre-formed stabilizer processes, a macromer is reacted with monomers to form a co-polymer composed of macromer and monomers. These co-polymers comprising a macromer and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

For example, U.S. Pat. No. 5,196,476 discloses a pre-formed stabilizer composition prepared by polymerizing a macromer and one or more ethylenically unsaturated monomers in the presence of a free-radical polymerization initiator and a liquid diluent in which the pre-formed stabilizer is essentially insoluble. EP 0,786,480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromer, at least one ethylenically unsaturated monomer, and a free radical polymerization initiator.

It is known that large, bulky molecules are effective macromers because less material can be used to sterically stabilize the particles. See, for example, EP 0786480. Generally speaking, this is due to the fact that a highly branched polymer has a considerably larger excluded volume than a linear molecule (such as, e.g., a monol), and therefore less of the branched polymer is required. U.S. Pat. No. 5,196,476 discloses that functionalities of 2 and higher, and preferably 3 and higher, are suitable to prepare macromers. EP 0,162, 589 and U.S. Pat. No. 5,990,185 describe a macromer, and its use for preparing polymer polyols, wherein the macromer is prepared by transesterification of a vinyl alkoxysilane with a polyol. The preferred macromers comprise the reaction products of vinyltrimethoxy silane, vinyltriethoxy silane, or vinyltripropoxy silane with mixtures of a group of polyether polyols characterized by functionalities ranging from 2 to 6. Such macromers would be expected to have at least 3 polyether tails. Coupling multi-functional polyols with polyisocyanates is also known and described in the field of polymer polyols as a suitable means to increase the molecular weight of the macromer. EP 0786480 discloses a process for preparation of a pre-formed stabilizer wherein the liquid polyol comprises at least 30% coupled polyol. As described therein, a high concentration of coupled polyol is useful for obtaining particles with a small particle size in the pre-formed stabilizer (PFS) and the induction of reactive unsaturation into a coupled polyol is a useful means for incorporating coupled polyol into the particles. U.S. Pat. No. 6,013,731 discloses that the stability of the dispersion can be significantly enhanced by coupling high molecular weight polyols to form an even higher molecular weight product. Macromers prepared from polyols with low intrinsic unsaturation (<0.020 meq/gram) are also described in U.S. Pat. No. 6,013,731. The '731 patent further discloses that such polyols have a low concentration of oxyalkylated, allylic unsaturation-containing monols, and are therefore advantageous because the high concentration of monols present in conventional polyols lowers the average functionality of the polyol.

Macromers based on multi-functional polyols and which have multiple sites of reactive unsaturation are described in U.S. Pat. No. 5,196,476. As described therein, there is an upper limit to the concentration of unsaturation when making macromers by the maleic anhydride route. If the ratio of moles of unsaturation per mole of polyol is too high, then there is a higher probability that species will be formed which have more than one double bond per molecule. Typically, the '476 patent employs from about 0.5 to about 1.5 moles, and preferably from about 0.7 to about 1.1 moles, of the reactive unsaturated compound for each mole of the alkoxylated polyol adduct.

There are also examples in the art of macromers based on "zerols." As used herein, zerols are polyethers with no terminal primary hydroxyl group. There are a series of patents issued to Dow Chemical relating to the preparation of zerols by derivatizing a polyether monol with an adduct which contains reactive unsaturation. See U.S. Pat. Nos. 4,394,491, 4,477,603, 4,493,908, 4,500,675, 4,663,475, 4,513,124, 4,588,830, and 4,640,935. These patents are similar in that they use semi-batch processes with no preformed stabilizer, they focus mainly on acrylate/methacrylate unsaturation, and the end product when monols are used is a zerol with no free hydroxyl group. Key to each patent is the method in which the monol derivatization is performed.

U.S. Pat. No. 5,854,386 discloses stabilizers for polymer polyols which contain both hydroxyl-functionality and unsaturation-functionality. These are prepared by oxyalkylating an unsaturated monomer having at least one oxyalkylatable hydrogen in the presence of an effective amount of a DMC catalyst, and optionally, in the presence of a free-radical polymerization inhibitor. These stabilizers preferably correspond to mixtures containing one or more of the two formulae: R[—(—R$^2$—O—)$_n$H]$_o$ or R—(—X—{—(R$^2$—O)$_n$—H}$_m$)$_o$ wherein: o is an integer between 1 and 8; n is an integer whose average value is such that the product n·o is from 10 to 500; R$^2$ is alkylene or substituted alkylene; X is a linking group; and R is a C$_{2-30}$ hydrocarbon containing at least one site of ethylenic or ethylynic (acetylenic) unsaturation, optionally substituted by non-reactive groups and optionally containing interspersed heteroatoms. R may be aliphatic, cycloaliphatic, aromatic, arylaliphatic, heteroaromatic, etc. with the proviso that when R is aromatic or heteroaromatic, the aromatic ring structure is substituted by at least one ethylenic or ethylynic radical-containing group.

U.S. Pat. No. 4,680,358 describes macromers of polyethers having a styryl functional head group on one end, and a terminal hydroxyl group at the other end. These macromers are polymerizable through the head group with a copolymerizable monomer (such as acrylonitrile, styrene, acrylic acid, etc.), and the terminal hydroxyl group at the other end. Polymerization of this macromer yields a polymacromer with a saturated hydrocarbon backbone having polyether branches, i.e. a graft or comb copolymer. These macromers are formed by cationic ring-opening polymerization of a cyclic ether in conjunction with an alkenyl alcohol.

The present invention describes novel macromers comprising one or more ethylenically unsaturated double bond and at least one polyether chain terminated in a hydroxyl group, the preparation of these novel macromers, polymer polyols comprising the novel macromere, and the preparation of these polymer polyols from these novel macromers. The novel macromers of the present invention have at least one double bond and at least one polyether chain with a terminal hydroxy group per molecule. A key advantage of the present invention is ability to produce low viscosity polymer polyols using a variety of macromers based on novel α,β-unsaturated carbonyl compounds.

SUMMARY OF THE INVENTION

This invention relates to ethylenically unsaturated macromers, to a process for the preparation of these ethylenically unsaturated macromers, to pre-formed stabilizers based on ethylenically unsaturated macromers, to a process for the preparation of these pre-formed stabilizers, to polymer polyols (i.e., stable dispersions) comprising these pre-formed stabilizers, and to a process for the preparation of these polymer polyols (i.e., stable dispersions). This invention also relates to polymer polyols prepared from ethylenically unsaturated macromers and to a process for the preparation of these polymer polyols.

The process for preparing the novel ethylenically unsaturated macromers of the present invention comprises
(1) reacting
(a) a compound corresponding to the formula:

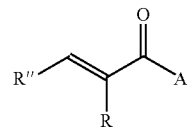

wherein:
R: represents a hydrogen atom, a branched or straight chain hydrocarbon group containing from 1 to 8 carbon atoms, or an aryl group containing from 6 to 12 carbon atoms;
R": represents a hydrogen atom, a branched or straight chain hydrocarbon group containing from 1 to 8 carbon atoms and which may be saturated or unsaturated, or an aryl group containing from 6 to 12 carbon atoms;
A: represents a chlorine atom, a bromine atom, a fluorine atom, an iodine atom, or the group OR', wherein:
R': represents a hydrogen atom or an alkyl group containing from 1 to 8 carbon atoms;
with
(b) a polyether polyol having an OH number of 10 to 300 and a functionality of 2 to 15;
optionally, in the presence of
(c) at least one catalyst.

The present invention also relates to novel ethylenically unsaturated macromers which comprise the reaction product of:
(a) a compound corresponding to the formula:

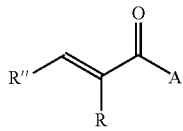

wherein:
R: represents a hydrogen atom, a branched or straight chain hydrocarbon group containing from 1 to 8 carbon atoms, or an aryl group containing from 6 to 12 carbon atoms;
R": represents a hydrogen atom, a branched or straight chain hydrocarbon group containing from 1 to 8 carbon atoms and which may be saturated or unsaturated, or an aryl group containing from 6 to 12 carbon atoms;
A: represents a chlorine atom, a bromine atom, a fluorine atom, an iodine atom, or the group OR', wherein:
R': represents a hydrogen atom or an alkyl group containing from 1 to 8 carbon atoms;
with
(b) a polyether polyol having an OH number of 10 to 300 and a functionality of 2 to 15;
optionally, in the presence of
(c) at least one catalyst.

The present invention also relates to a process for preparing a pre-formed stabilizer comprising:
(1) free-radically polymerizing
(A) the ethylenically unsaturated macromer as described above,
with
(B) at least one ethylenically unsaturated monomer,
in the presence of
(C) at least one free-radical polymerization initiator,
and, optionally,
(D) a liquid diluent,
and, optionally
(E) a chain transfer agent.

These pre-formed stabilizers are another aspect of the present invention. This pre-formed stabilizer comprises the free-radical polymerization product of:
(A) the ethylenically unsaturated macromer as described above,
with
(B) at least one ethylenically unsaturated monomer,
in the presence of
(C) at least one free-radical polymerization initiator,
and, optionally,
(D) a liquid diluent,
and, optionally
(E) a chain transfer agent.

In addition, the present invention also relates to polymer polyols comprising these pre-formed stabilizers and to a process for their preparation.

This process for preparing polymer polyols comprises: (1) free-radically polymerizing: (I) a base polyol, (II) the pre-formed stabilizer as described above, and (III) at least one ethylenically unsaturated monomer, in the presence of (IV) at least one free-radical polymerization initiator, and, optionally, (V) a chain transfer agent.

These polymer polyols of the present invention comprise the free-radical polymerization product of: (I) a base polyol, (II) the pre-formed stabilizer described above, and (III) at least one ethylenically unsaturated monomer, in the presence of (IV) at least one free-radical polymerization initiator, and, optionally, (V) a chain transfer agent.

The present invention also relates to polymer polyols comprising ethylenically unsaturated macromers, and to a process for the preparation of these polymer polyols.

These polymer polyols comprise the free-radical polymerizaton product of:
(I) a base polyol;
(II) an ethylenically unsaturated macromer as described above and which comprises the reaction product of:
(a) a compound corresponding to the formula:

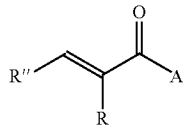

wherein:
R: represents a hydrogen atom, a branched or straight chain hydrocarbon group containing from 1 to 8 carbon atoms, or an aryl group containing from 6 to 12 carbon atoms;
R": represents a hydrogen atom, a branched or straight chain hydrocarbon group containing from 1 to 8 carbon atoms and which may be saturated or unsaturated, or an aryl group containing from 6 to 12 carbon atoms;
A: represents a chlorine atom, a bromine atom, a fluorine atom, an iodine atom, or the group OR', wherein:
R': represents a hydrogen atom or an alkyl group containing from 1 to 8 carbon atoms;
with
(b) a polyether polyol having an OH number of 10 to 300 and a functionality of 2 to 15;
optionally, in the presence of
(c) at least one catalyst.
and
(III) at least one ethylenically unsaturated monomer;
in the presence of
(IV) at least one free-radical polymerization initiator;
and, optionally,
(V) a chain transfer agent.

The process for preparing these polymer polyols comprises (A) free-radically polymerizing: (I) a base polyol, (II) the ethylenically unsaturated macromer as described above, and (III) at least one ethylenically unsaturated monomer, in the presence of (IV) at least one free-radical polymerization initiator, and, optionally, (V) a chain transfer agent. Suitable ethylenically unsaturated macromers for this process are those as described previously in the polymer polyols prepared directly from ethylenically unsaturated macromers.

Another aspect of the present invention relates to foams prepared from these polymer polyols, and to a process for making these foams. These foams comprise the reaction product of a polyisocyanate or prepolymer thereof, with an isocyanate-reactive component wherein at least one of the above described polymer polyols is used as at least a portion of the isocyanate-reactive component. Suitable polymer polyols for foams and the processes of making the foams include those polymer polyols which are prepared directly from an ethylenically unsaturated macromer as described herein, and those polymer polyols which are prepared from a preformed stabilizer based on an ethylenically unsaturated macromer.

DETAILED DESCRIPTION OF THE INVENTION

The ethylenically unsaturated macromers of the invention include those compounds which comprise the reaction product of
(a) a compound corresponding to the formula:

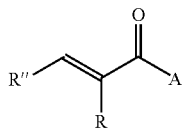

wherein:
R: represents a hydrogen atom, a branched or straight chain hydrocarbon group containing 1 to 8 carbon atoms, or an aryl group containing from 6 to 12 carbon atoms,
R": represents a hydrogen atom, a branched or straight chain hydrocarbon group containing 1 to 8 carbon atoms and which may be saturated or unsaturated, or an aryl group containing from 6 to 12 carbon atoms, and
A: represents a chlorine atom, a bromine atom, a fluorine atom, an iodine atom or the group OR', wherein:
R': represents a hydrogen atom, or an alkyl group containing from 1 to 8 carbon atoms;
with
(b) one or more polyether polyols having an OH number of from about 10 to about 300 and a functionality of from about 2 to about 15.

In the above formula for compounds (a), it is preferred that:
R: represents hydrogen, methyl, ethyl, propyl, or butyl,
R": represents hydrogen, methyl, ethyl, propyl, butyl, phenyl, or an alkylene group such as ethenyl or propenyl,
and
A: represents chlorine, bromine, iodine, or the group OR', wherein
R': represents hydrogen, methyl, or ethyl.

Suitable compounds to be used as component (a) in the ethylenically unsaturated macromers include compounds such as, for example, acryloyl chloride, acryloyl bromide, methacryloyl chloride, methacryloyl bromide, acrylic acid, methacrylic acid, methyl methacrylate, cinnamic acid, methyl cinnamate, 2,4-hexadienoic acid, methyl sorbate. More preferred are the acrylate compounds. Most preferred are the methacrylates.

Suitable polyether polyols for component (b) which is to be reacted with the compounds (a) in the ethylenically unsaturated macromers include those having a functionality of at least about 2, preferably at least about 3, and more preferably at least about 4. The functionality of suitable polyether polyols is less than or equal to about 15, preferably less than or equal to about 10, and most preferably less than or equal to about 8. The suitable polyether polyols may also have functionalities ranging between any combination of these upper and lower values, inclusive. The OH numbers of suitable polyether polyols is at least about 10, preferably at least about 15, and most preferably at least about 18. Polyether polyols typically also have OH numbers of less than or equal to about 300, preferably less than or equal to about 200, and most preferably less than or equal to about 100. The suitable polyether polyols may also have OH numbers ranging between any combination of these upper and lower values, inclusive. The (number average) molecular weights of suitable polyether polyols is typically greater than about 400, preferably at least about 2,000, and most preferably at least about 4,000. Polyether polyols typically have (number average) molecular weights of less than or equal to 15,000, more preferably less than or equal to 12,000, and most preferably less than or equal to 9,000. The suitable polyether polyols may also have (number average) molecular weights ranging between any combination of these upper and lower values, inclusive.

These polyether polyols may also have functionalities ranging from about 2 to about 15, preferably from about 3 to about 10, and most preferably from about 4 to about 8; OH numbers ranging from about 10 to 300, preferably from about 15 to about 200, and most preferably from about 18 to about 100; and (number average) molecular weights ranging from greater than 400 to about 15,000, preferably about 2,000 to 12,000, and most preferably about 4,000 to 9,000.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethylolethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris (hydroxy-phenyl)propanes, condensation products of various phenolic compounds and glyoxal, glutaraldehyde, other dialdehydes, including the 1,1,2,2-tetrakis (hydroxyphenol) ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

The reaction between compounds corresponding to formula (a) and the polyether polyols (b) may occur in the presence of (c) one or more catalysts. Virtually any catalyst known to be suitable for esterification and/or transesterification reactions can be used as component (c) in the present invention. Examples of suitable catalysts (c) for this invention include, for example, compounds such as, acetic acid, phosphoric acid, p-toluenesulfonic acid, methanesulfonic acid, tetrabutyl titanate, tetraethyl titanate, potassium acetate, sodium hydroxide, triethylamine, tributylamine, pyridine, and N,N-dimethylaniline.

In the process for preparing the ethylenically unsaturated macromer, the compound corresponding to formula (a) is typically reacted with the polyether polyol (b) at temperatures of about 25 to about 250° C. for time periods of from about 1 to about 10 hours, optionally, in the presence of a catalyst. It is preferred that this reaction is at temperatures of about 60 to about 200° C. for a time of from about 2 to about 7 hours.

In accordance with the process of preparing a pre-formed stabilizer, an ethylenically unsaturated macromer is free-radically polymerized with at least one ethylenically unsaturated monomer in the presence of at least one free-radical polymerization initiator and, optionally, a liquid diluent, and, optionally a chain transfer agent.

In pre-formed stabilizers and the process of making the pre-formed stabilizers, the ethylenically unsaturated macromers as described hereinabove may be used. The ethylenically unsaturated macromers for this aspect of the invention comprise the reaction product of (a) a compound corresponding to the formula:

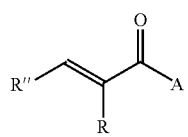

wherein R, R" and A are as defined above,
with
(b) a polyether polyol having an OH number of from 10 to 300 and a functionality of from 2 to 15,
optionally in the presence of
(c) at least one catalyst.

With respect to the pre-formed stabilizers and to the process of making these in accordance with the present invention, it is preferred that in (a) the compounds corresponding to the above formula which are used to make the ethylenically unsaturated macromers described above,
R: represents hydrogen, methyl or ethyl,
R": represents hydrogen, methyl, ethyl or phenyl,
and
A: represents chloride, hydroxyl, methoxy or ethoxy.

Furthermore, in (a) the compound corresponding to the above formula, it is particularly preferred that:
R: represents hydrogen or methyl,
R": represents hydrogen or phenyl,
and
A: represents hydroxyl or methoxy.

Suitable ethylenically unsaturated monomers for the pre-formed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred.

When using a mixture of monomers, it is preferred to use a mixture of two monomers. These monomers are typically used in weight ratios of from 80:20 (styrene:acrylonitrile) to 40:60 (S:AN), and preferably of from 75:25 (S:AN) to 50:50 (S:AN).

Suitable free-radical polymerization initiators for this aspect of the present invention include, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, optionally the liquid diluent and/or the chain transfer agent.

Suitable diluents for the pre-formed stabilizers of the present invention include, for example, compounds such as mono-ols (i.e., monohydroxy alcohols), polyols, hydrocarbons, ethers etc., and mixtures thereof. Suitable mono-ols include all alcohols which contain at least one carbon atom, such as, for example, methanol, ethanol, n-propanol, isopropanol, n-butanol, sec.-butanol, tert-butanol, n-pentanol, 2-pentanol, 3-pentanol, etc. and mixtures thereof. A preferred mono-ol is isopropanol.

Suitable polyols comprise poly(oxypropylene) glycols, triols and higher functionality polyols. Such polyols include poly(oxypropylene-oxyethylene) polyols; however, desirably the oxyethylene content should comprise less than about 50% of the total and, preferably less than about 20%. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. Preferred polyols of the present invention are those which are prepared using DMC catalysis. These polyols have low unsaturation, typically 0.02 meq/g or less as measured using ASTM D2849-69. The extent of unsaturation does not affect in any adverse way the formation of the polymer polyols in accordance with the present invention.

For purposes of the present invention, useful polyols should have a number average molecular weight of about 400 or greater, the number average being used herein being the theoretical, hydroxyl number derived value. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 20 and lower, to about 280 and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = (56.1 - 1000 \times f)/m.w.$$

where:
OH=hydroxyl number of the polyol;
f=functionality, that is, average number of hydroxyl groups per molecule of the polyol; and
m.w.=molecular weight of the polyol.

The exact polyol employed depends upon the end use of the polyurethane product to be produced. The molecular weight of the hydroxyl number is selected properly to result in flexible or semi-flexible foams or elastomers when the polymer polyol produced from the polyol is converted to a polyurethane. The polyols preferably possess a hydroxyl number of from about 50 to about 150 for semi-flexible foams and from about 30 to about 70 for flexible foams. Such limits are not intended to be restrictive, but are merely illustrative of the large number of possible combinations of the above polyol coreactants.

While also not preferred, any other type of known polyol may also be used. Among the polyols which can be employed are one or more polyols from the following classes of compositions, known to those skilled in the art of polyurethane chemistry: (a) alkylene oxide adducts of non-reducing sugars and sugar derivatives; (b) alkylene oxide adducts of phosphorus and polyphosphorus acids; (c) alkylene oxide adducts of polyphenols; (d) the polyols from natural oils such as castor oil, and the like; (e) alkylene oxide adducts of polyhydroxyalkanes other than those already described herein.

Illustrative alkylene oxides of polyhydroalkanes include, among others, the alkylene oxide adducts of 1,3-dihydroxypropane, 1,3-dihydroxy-butane, 1,4-dihydroxybutane, 1,4-, 1,5- and 1,6-dihydroxyhexane, 1,2-, 1,3-,1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolpropane, pentaerythritol, caprolactone, polycaprolactone, xylitol, arabitol, sorbitol, mannitol, and the like.

Another class of polyols which can be employed are the alkylene oxide adducts of the non-reducing sugars, wherein the alkylene oxides have from 2 to 4 carbon atoms, Among the non-reducing sugars and sugar derivatives contemplated are sucrose, alkyl glycosides such as methyl glucoside, ethylglucoside, and the like, glycol glucosides such as ethylene glycol glucoside, propylene glycol glucoside, glycerol glucoside, 1,2,6-hexanetriol glucoside, and the like, as well as the alkylene oxide adducts of the alkyl glucosides as set forth in U.S. Pat. No. 3,073,788, the disclosure of which is herein incorporated by reference.

A still further useful class of phenol is the polyphenols, and preferably the alkylene oxide adducts thereof wherein the alkylene oxide adducts have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest members of this call being the 1,1,3-tris(hydroxyphenyl)propanes, condensation products of various phenolic compounds and glyoxal, glutaraldehyde, and other dialdehydes, the simplest members of this call being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxy-propane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Preferred polyol components to be used as diluents in the present invention typically include, for example, the alkylene oxide adducts of suitable starter materials having 4 or more hydroxyl groups such as, for example, pentaerythritol, sorbitol, diether of sorbitol, mannitol, diether of mannitol, arabitol, diether of arabitol, sucrose, oligomer of polyvinyl alcohol or glycidol, mixtures thereof, etc.

When using a mixture of a mono-ol and a polyol as the diluent for the pre-formed stabilizer, the polyol preferably comprises only a minor amount of the diluent and the mono-ol comprises a major amount. In general, the polyol will comprise less than 30 weight percent of the diluent, preferably less than about 20 weight percent, and most preferably less than about 15 weight percent. The amount of the polyol component present in the diluent is below the concentration at which gelling occurs in the pre-formed stabilizer.

Generally, the quantity of diluent is >40% by weight, based on 100% by weight of the PFS (pre-formed stabilizer).

Chain transfer agents may, also be present in the pre-formed stabilizers of the present invention and the process of making the pre-formed stabilizers. Suitable chain transfer agents for this aspect of the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Chain transfer agents are also commonly referred to as molecular weight regulators. These compounds are employed in conventional amounts to control the molecular weight of the copolymerizate.

Suitable processes for preparing the pre-formed stabilizers are similar to known methods described in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. In general, the process of preparing the pre-formed stabilizer is similar to the process of preparing the polymer polyol. The temperature range is not critical and may vary from about 80 to about 150° C. or higher, and preferably from about 115 to about 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

In a preferred embodiment, the pre-formed stabilizer of the present invention comprises dispersions in the diluent and any unreacted monomer in which the pre-formed stabilizer is probably present as individual molecules or as groups of molecules in micelles or on the surface of small polymer particles.

The combination of conditions selected for the preparation of the pre-formed stabilizer should not lead to cross-linking or gel formation in the pre-formed stabilizer which can adversely affect the ultimate performance in preparing the polymer polyol composition. Combinations of too low a diluent concentration, too high a precursor and/or monomer concentration, too high a catalyst concentration, too long of a reaction time, and too much unsaturation in the precursor can result in ineffective preformed stabilizer from cross-linking or gelling.

Particularly preferred processes of preparing the pre-formed stabilizers of the present invention include those as described in, for example, U.S. Pat. No. 5,196,476 and U.S. Pat. No. 6,013,731, the disclosures of which are herein incorporated by reference. Preferred diluents and relative concentrations, ethylenically unsaturated monomers and relative concentrations, free-radical initiators and relative concentrations, and process conditions are disclosed in U.S. Pat. No. 5,196,476 and U.S. Pat. No. 6,013,731, the disclosures of which are herein incorporated by reference. Obviously, the ethylenically unsaturated macromers suitable for the present invention differ from the macromers described by these references, thus resulting in structurally different preformed stabilizers.

The polymer polyols (i.e., stable dispersions) of the present invention comprise the free-radical polymerization product of a base polyol, the pre-formed stabilizer described above, and one or more ethylenically unsaturated monomers in the presence of at least one free-radical initiator, and optionally, a chain transfer agent, and the process for the preparation of polymer polyols (i.e., stable dispersion) comprises free-radically polymerizing these components. The resultant polymer polyols exhibit high solids contents, i.e., from 30 to 60% by weight, based on the total weight of the resultant polymer polyol. It is preferred that the solids content of the polymer polyols ranges from 40 to 50% by weight. These polymer polyols also exhibit low viscosities, i.e. from 2000 to 10,000 cSt, and preferably 4,000 to 6,000 cSt; good filterability; and are preferably white in color.

Suitable base polyols for this aspect of the present invention include, for example, base polyols such as, for example, polyether polyols. Suitable polyether polyols include those having a functionality of preferably at least about 2, and more preferably at least about 3. The functionality of suitable polyether polyols is less than or equal to about 8, preferably less than or equal to about 6, and most preferably less than or equal to about 5. The suitable polyether polyols may also have functionalities ranging between any combination of these upper and lower values, inclusive. The OH numbers of suitable polyether polyols is at least about 10, preferably at least about 15, and most preferably at least about 20. Polyether polyols typically also have OH numbers of less than or equal to about 180, preferably less than or equal to about 100, and most preferably less than or equal to about 70. The suitable polyether polyols may also have OH numbers ranging between any combination of these upper and lower values, inclusive. The (number average) molecular weights of suitable polyether polyols is typically greater than about 600, preferably at least about 2,000 and most preferably at least about 3,000. Polyether polyols typically have (number average) molecular weights of less than or equal to 15,000, more preferably less than or equal to 12,000 and most preferably less than or equal to 8,000. The suitable polyether polyols may also have (number average) molecular weights ranging between any combination of these upper and lower values, inclusive.

These polyether polyols may also have functionalities ranging from about 2 to about 8, preferably from about 2 to about 6, and most preferably from about 3 to about 5; OH numbers ranging from about 10 to 180, preferably from about 15 to about 100, and most preferably from about 20 to about 70; and (number average) molecular weights ranging from greater than 600 to about 15,000, preferably about 2,000 to 12,000 and most preferably about 3,000 to 8,000.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethylolethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris (hydroxyphenyl)propanes, condensation products of various phenolic compounds and glyoxal, glutaraldehyde, other dialdehydes, including the 1,1,2,2-tetrakis (hydroxyphenol) ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable pre-formed stabilizers for this aspect of the present invention include those described herein above.

The ethylenically unsaturated monomers suitable for the polymer polyols of the present invention and the process of preparing these include those ethylenically unsaturated monomers described above with respect to the preparation of the pre-formed stabilizer. Other suitable monomers include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable to be employed in making the polymer polyol. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may is from about 80:20 to 30:70, more preferably from about 75:25 to 50:50. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols comprising a pre-formed stabilizer is at least about 30% by weight, based on 100% by weight of the polymer polyol. It is preferred that the solids content is from about 35 to about 70% by weight, more preferably from about 35 to less than 60% by weight, and most preferably from about 40 to about 50% by weight.

Overall, the quantity of ethylenically unsaturated monomer(s) present in the polymer polyols comprising the ethylenically unsaturated macromers of the present invention is at least about 20% by weight, based on 100% by weight of the polymer polyol. It is preferred that the solids content is from about 20 to about 45% by weight.

Suitable free-radical initiators include those as described previously for the preparation of the pre-formed stabilizers. Among the useful initiators are those catalysts having a satisfactory half-life within the temperature ranges used in forming the stabilizer, i.e. the half-life should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroctoate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis (isobutyronitrile), 2,2'-azo bis-(2-methoxylbutyronitrile), and mixtures thereof. Most preferred are the acyl peroxides described above and the azo catalysts. A particularly preferred initiator comprises azobis(isobutyronitrile).

The quantity of initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable chain transfer agents for the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Chain transfer agents are also commonly referred to as molecular weight regulators. These compounds are employed in conventional amounts to control the molecular weight of the copolymerizate.

Polymer polyols comprising the pre-formed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The various components of the polymer polyols of the present invention which comprise the free-radical polymerization product of (I) a base polyol, (II) an ethylenically unsaturated macromer, and (III) at least one ethylenically unsaturated monomer, in the presence of (IV) at least one free-radical polymerization initiator, and (V) a chain transfer agent, include those components described above with respect to the polymer polyols comprising the preformed stabilizers of the invention. Of course, these polymer polyols use the ethylenically unsaturated macromers described above as reactants in the preformed stabilizers and in the process of preparing the pre-formed stabilizers, to form the polymer polyols instead of the pre-formed stabilizers. The remaining components, their relative amounts and/or ratios are as described above, unless otherwise stated.

These polymer polyols comprising one or more ethylenically unsaturated macromers which correspond to those described above for the pre-formed stabilizers, are prepared by utilizing the processes as disclosed in, for example, U.S. Pat. Nos. 3,875,258, 3,931,092, 3,950,317, 3,953,393, 4,014,846, 4,093,573, 4,372,005, 4,334,049, 4,454,255, 4,458,038, 4,689,354, 4,690,956, Re 29,014, U.S. Pat. Nos. 4,305,861, 5,093,412, 5,254,667, 6,172,164 and Re 33,291, as well as in U.S. Pat. Nos. 4,524,157, 4,539,340, Re 28,715 and Re 29,118, all of the disclosures of which are herein incorporated by reference.

In a particularly preferred embodiment of the polymer polyols comprising ethylenically unsaturated macromers, it is preferred that the ethylenically unsaturated macromers as described and claimed herein are used as ethylenically unsaturated macromers for polymer polyols and the process of making these.

The temperature range is not critical, and may vary from about 100° C. to about 140° C. or perhaps greater, the preferred range being from 115 to 125° C. As has been noted herein, the catalyst and temperature should be selected such that the catalyst has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in certain tubular reactors, e.g., in the first stages of "Marco" reactors when such reactors are operated with all the monomer added to the first stage.

The utilization of the processes as described in U.S. Pat. Nos. 5,196,476 and 6,013,731 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,916,476 and 6,013,731 are essential depends on whether the process parameters are such that a satisfactory polymer polyol can be prepared without using either of these processes.

The polymer polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer polyols are higher useful, particularly when the end use application requires as little scorch as possible. In the preferred embodiment, essentially all of the product (i.e., about 99% or more) will pass through the filter employed in the filtration hindrance (filterability) test that will be described in conjunction with the Examples. This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50% of the product passes through the filter. Some applications may also find useful products in which only about 20% or even less passes through the filter. Accordingly, the polymer polyols of the present invention desirably contemplate the products in which only 20% pass through the filter, preferably at least 50%, and most preferably, essentially all passes through the filter.

The filtration hindrance test presents the rigorous test of polymer polyol stability, and accordingly, while satisfactory filtration hindrance characteristics are certainly to be preferred, commercially stable polymer polyols for a variety of applications may be satisfactory defined by their viscosity and centrifugible solids level (this test being also described in connection with the Examples). Thus, polymer polyols are considered stable as long as the viscosity is no more than about 6,000 cSt at 25° C. and the centrifugible solids are less than about 10%, preferably less than 5%.

In accordance with the present invention, the stabilizer is present in an amount sufficient to insure that satisfactory stabilization will result in the desired filtration hindrance, centrifugible solids level and viscosity. In this regard, the quantity of pre-formed stabilizer generally ranges from about 1 to about 20% (preferably from about 1 to about 10%) by weight, based on the total feed. As one skilled in the art knows and understands, various factors including, for example, the free-radical initiator, the solids content, the weight ratio of S:AN, process conditions, etc., will effect the optimum quantity of pre-formed stabilizer.

Polyurethanes, preferably polyurethane foams, comprising the polymer polyols and processes for their production are also part of the present invention. Suitable polymer polyols for these polyurethanes may be either those prepared directly from ethylenically unsaturated macromers, or those prepared from pre-formed stabilizers which are based on ethylenically unsaturated macromers. These polyurethanes comprise the reaction product of a polyisocyanate component or prepolymer thereof, with an isocyanate-reactive component comprising the polymer polyols of the invention. The processes for preparing these polyurethanes comprises reacting a polyisocyanate component or prepolymer thereof, with an isocyanate-reactive component comprising the polymer polyols of the present invention.

In addition to use as stabilizers in polyether polymer polyol production, the reactive unsaturation-containing stabilizers of the subject invention may also be used for other products, for example, but not by limitation, to form impact modifiers. For example, preformed vinyl polymer impact modifiers may be prepared by reacting the reactive unsaturation-containing stabilizer with one or more polymerizable vinyl monomers such as those discussed previously, as well as multiply unsaturated monomers such as butadiene and the like. The polymerization may be affected neat, in solution in suitable solvent, or in ordinary or reverse emulsion in an aqueous system. The reactive unsaturation-containing stabilizers can also be used as a stabilizer for cement additive by copolymerizing with monomers such as acrylic acid. The stabilizers may also serve as a reactant in radiation cured coatings.

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all parts and percentages are parts by weight and percentages by weight, respectively.

EXAMPLES

The following components were used in the working examples.

Polyol A: A glycerine-started polyether polyol produced by reacting propylene oxide and ethylene oxide in the presence of potassium hydroxide catalyst, and refining to remove the catalyst. The resultant poly has a hydroxyl number of about 52, a number average molecular weight of about 3235 and a functionality of about 3.

Polyol B: A sorbitol-started polyether polyol produced by reacting propylene oxide and ethylene oxide in the presence of potassium hydroxide catalyst, and refining to remove the catalyst. The resultant polyol has a hydroxyl number of about 28, a number average molecular weight of about 12,020 and a functionality of about 6.

Polyol C: A trimethylolpropane started polyether polyol produced by reacting propylene oxide and ethylene oxide in the presence of potassium hydroxide catalyst, and refining to remove the catalyst. The resultant polyol has a hydroxyl number of about 28, a number average molecular weight of about 6,000 and a functionality of about 3

Isocyanate A: Diphenylmethane 4,4'-diisocyanate (MDI), commercially available from Bayer Polymers Catalyst A: A polyurethane amine catalyst suitable for foams, sold by Dow Chemical Company as NIAX Catalyst A-1.

Catalyst B: A polyurethane foam catalyst comprising stabilized stannous octoate, commercially available as T-9 from Air Products.

Surfactant A: A silicone surfactant suitable for use in foam, commercially available from Dow Chemical Company as "Silicone Surfactant L-620."

BHT: Butylated hydroxytoluene

TDI: A mixture of 80 wt-% 2,4-diisocyanatotoluene and 20 wt-% 2,6-diisocyanatotoluene.

Initiator A: tert-butyl peroxide (TBPO)

Initiator B: Azobis(isobutyronitrile), commercially available as VAZO 64 from DuPont.

The following properties and units, along with ASTM's, were also used in the working examples.

Viscosity: Viscosities were measured using a Cannon-Fenske viscometer.

Density: Density in pounds per cubic foot. (ASTM D-3574, Test A).

IFD 25%: Indentation Force Deflection 25% (ASTM D-3574, Test B1 and Test B2).

IFD 65%: Indentation Force Deflection 65% (ASTM D-3574, Test B1 and Test B2).

IFD 65/25: Indentation Force Deflection 65% divided by Indentation Force Deflection 25% (ASTM D-3574, Test B1 and Test B2).

Tensile: Tensile strength in psi (ASTM D-3574, Test E).

Elongation: Elongation in percent (ASTM D-3574, Test E).

Tear: Tear resistance in pounds per inch (ASTM D-3574, Test F).

General Procedure for Macromers

Macromer I: Macromer I was prepared by reacting acrylic acid (1 mole) with 1 mole of Polyol C via azeotropic esterification using 0.1% by weight p-toluene sulfonic acid and toluene as a solvent.

Macromer II: Polyol B was charged to a stirred reactor and heated to 80° C. Maleic anhydride (0.889 wt-% based on Polyol B charge) was then charged to the reactor. After the polyol and maleic anhydride mixture was adequately mixed, 60 ppm KOH was added and the mixture reacted for 1 hr at 110° C. The acid groups were then capped with ethylene oxide (1.0 wt-% based on Polyol B charge) by stirring the mixture at 110° C. until the acid number was reduced to <0.4 mg KOH/g. The mixture was then vacuum-stripped to remove residual EO and reacted at 80° C. with 1000 ppm morpholine for 6 hours. The molar ratio of maleic anhydride to polyol was 0.55.

To the mixture described in the paragraph above, Isocyanate A (0.93 wt-% based on Polyol B charge) was charged. The mixture was reacted at 63° C. to reach a viscosity of 6500 cSt and was inhibited with 500 ppm BHT. This product is referred to herein as Macromer II.

Macromer III: Methyl acrylate (0.35 mole) was reacted with Polyol B (0.58 mole) at 205° C. in the presence of titanium butoxide catalyst (200 ppm). A fractional distillation column was used to keep acrylate in the flask while allowing methanol to distill over. The measured molar ratio was 0.40 moles acrylate/mole polyol. This product is herein referred to as Macromer III Macromer IV: Using the method described above for Macromer III, Macromer IV was prepared using methyl methacrylate as a substitute for methyl acrylate. The measured molar ratio was 0.40 moles methacrylate/mole polyol.

Macromer V: Macromer V was prepared by reacting methacrylic acid (1 mole) with 1 mole of Polyol B via azeotropic esterification using 0.1% by weight p-toluene sulfonic acid and toluene as a solvent. The measured molar ratio was 0.45 mole methacrylate/mole polyol.

Pre-Formed Stabilizer (PFS) Formulation

This series of examples relates to the preparation of pre-formed stabilizers made from macromers I–V to give PFS I–V, respectively. Each of the pre-formed stabilizers was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±1° C. The product from the second-stage reactor overflowed continuously through a pressure regulator designed to control the pressure in each stage at 65 psig. The pre-formed stabilizer then passed through a cooler and into a collection vessel. The formulations used for the pre-formed stabilizer are listed in Table 1.

TABLE 1

| Pre-formed Stabilizer Formulation | |
|---|---|
| Diluent type | isopropanol |
| Diluent concentration in feed, wt-% | 60.0 |
| Macromer concentration in feed, wt-% | 24.0 |
| Monomers concentration in feed, wt-% | 15.9 |
| Styrene/acrylonitrile ratio in feed, wt-% | 50/50 |
| Initiator A concentration, wt-% | 0.1 |

Examples 1–5

This series of examples relates to the preparation of polymer polyols made from pre-formed stabilizers I–V, respectively. Each of the polymer polyols was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±1° C. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The wt-% total polymer in the product was calculated from the concentrations of monomers measured in the crude polymer polyol before stripping. The parameters used in the experiments are listed in Table 2.

TABLE 2

| | Polymer polyol examples. | | | | |
|---|---|---|---|---|---|
| | Parameter | | | | |
| | 1 | 2 | 3 | 4 | 5 |
| Preparation Conditions | | | | | |
| Initiator B concentration in feed, wt-% | 0.25 | 0.25 | 0.25 | 0.25 | 0.25 |
| Base polyol type | A | A | A | A | A |
| base polyol concentration in feed, wt-% | 52.0 | 45.3 | 47.1 | 47.1 | 47.2 |
| Pre-formed stabilizer type | I | II | III | IV | V |
| Macromer type | I | II | III | IV | V |
| PFS concentration in feed, wt-% | 6.93 | 5.50 | 5.50 | 5.50 | 5.50 |
| Isopropanol conc. In feed, wt-% | 4.2 | 5 | 5.0 | 5.0 | 5.0 |
| Monomers concentration in feed, wt-% | 50.1 | 47.3 | 45.0 | 45.0 | 45.1 |
| Polymer S:AN ratio, wt-% | 63.5:36.5 | 65:35 | 65:35 | 65:35 | 65:35 |
| Product Properties | | | | | |
| Total polymer (stripped product), wt-% | 52.9 | 50.1 | 50.0 | 50.0 | 49.9 |
| Viscosity, cSt | 10,801 | 5336 | 5390 | 4549 | 4733 |

Examples 6–7

These examples relate to the preparation of free-rise foams from a commercially available polymer polyol and the polymer polyol made in Example 4.

The polymer polyol, amine catalyst, and silicone surfactant were added to a one-half gallon cylindrical paper container fitted with baffles. The contents were mixed at 2400 rpm for 60 seconds with an agitator having two turbine impellers. The mixture was then degassed for 10 seconds. After degassing, the tin catalyst was added and the contents mixed at 2400 rpm for 10 seconds. While the mixer was still rotating, toluene diisocyanate was added and the contents mixed for 5 seconds. The mixture was then poured into a 14 by 14 by 6-inch cardboard box, where it rose freely until the reaction was complete. The foam was then heated in an oven at 225° C. for 5 minutes. Foam properties were determined according to ASTM Standard D-3574-66. The parameters used in the experiments are listed in Table 3.

TABLE 3

| | Examples 6 and 7 | |
|---|---|---|
| | Example | |
| | 6 | 7 |
| Preparation Conditions | | |
| Polymer polyol type | A* | 4 |
| Polymer polyol, pphp | 100 | 100 |
| Water, pphp | 2.3 | 2.3 |
| Catalyst A, pphp | 0.03 | 0.03 |
| Catalyst B, pphp | 0.10 | 0.10 |
| Surfactant A, pphp | 0.45 | 0.45 |
| TDI, pphp | 30.5 | 30.5 |
| Product Properties | | |
| Density, lbs/ft$^3$ | 2.41 | 2.40 |
| IFD 25%, lbs | 147.3 | 140.9 |
| IFD 65%, lbs | 313.6 | 301.3 |

TABLE 3-continued

Examples 6 and 7

| | Example | |
|---|---|---|
| | 6 | 7 |
| IFD 65/25 | 2.13 | 2.14 |
| Tensile, lbs/in$^2$ | 31.6 | 32.3 |
| Elongation, % | 71.6 | 77.5 |
| Tear, lbs/in | 1.94 | 2.37 |

*Polymer Polyol A: a SAN filled polyether polyol comprising about 45% by wt. solids with the wt. ratio of styrene to acrylonitrile being 67:83, wherein the base polyol (16–52) is a polyether polyol having an OH number of about 53, a functionality of about 3, and being prepared by alkoxylating glycerine with propylene oxide Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated macromer which comprises the reaction product of:
  (a) a compound corresponding to the formula:

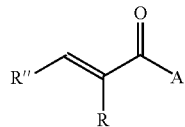

wherein:
    R: represents a hydrogen atom, a branched or straight chain hydrocarbon group containing from 1 to 8 carbon atoms, or an aryl group containing from 6 to 12 carbon atoms,
    R": represents a hydrogen atom, a branched or straight chain hydrocarbon group containing from 1 to 8 carbon atoms and which may be saturated or unsaturated, or an aryl group containing from 6 to 12 carbon atoms,
    and
    A: represents a chlorine atom, a bromine atom, a fluorine atom, a iodine atom, or the group OR', wherein:
      R' represents a hydrogen atom or an alkyl group having from 1 to 8 carbon atoms;
  with
  (b) a polyether polyol having an OH number of 10 to 300 and a functionality of 4 to 15,
  optionally, in the presence of
  (c) at least one catalyst.

2. The ethylenically unsaturated macromer of claim 1, wherein in compound (a):
  R: represents a hydrogen atom, a methyl group, an ethyl group, a propyl group or a butyl group,
  R": represents a hydrogen atom, a methyl group, an ethyl group, a propyl group, a butyl group, a phenyl group, an ethenyl group or an propenyl group,
  and
  A: represents a chlorine atom, a bromine atom, a iodine atom, or the group OR', wherein:
    R': represents hydrogen, a methyl group or an ethyl group.

3. The ethylenically unsaturated macromer of claim 1, wherein (b) said polyether polyol has a functionality of from about 4 to about 10, an OH number of from about 15 to about 200, and a molecular weight of from about 2,000 to about 12,000.

4. The ethylenically unsaturated macromer of claim 1, wherein (a) comprises methyl methacrylate.

5. A process for the preparation of an ethylenically unsaturated macromer, comprising
  (1) reacting:
    (a) a compound corresponding to the formula:

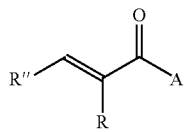

wherein:
      R: represents a hydrogen atom, a branched or straight chain hydrocarbon group containing from 1 to 8 carbon atoms, or an aryl group containing from 6 to 12 carbon atoms;
      R": represents a hydrogen atom, a branched or straight chain hydrocarbon group containing from 1 to 8 carbon atoms and which may be saturated or unsaturated, or an aryl group containing from 6 to 12 carbon atoms;
      and
      A: represents a chlorine atom, a bromine atom, a fluorine atom, a iodine atom, or the group OR', wherein:
        R' represents a hydrogen atom, or an alkyl group containing from 1 to 8 carbon atoms;
    with
    (b) a polyether polyol having an OH number of 10 to 300 and a functionality of 4 to 15,
    optionally in the presence of:
    (c) at least one catalyst.

6. The process of claim 5, wherein in compound (a):
  R: represents a hydrogen atom, a methyl group, an ethyl group, a propyl group or a butyl group,
  R": represents a hydrogen atom, a methyl group, an ethyl group, a propyl group, a butyl group, a phenyl group, an ethenyl group or an propenyl group,
  and
  A: represents a chlorine atom, a bromine atom, a iodine atom, or the group OR', wherein:
    R': represents a hydrogen atom, a methyl group or an ethyl group.

7. The process of claim 5, wherein (b) said polyether polyol has a functionality of from about 4 to about 10, an OH number of from about 15 to about 200, and a molecular weight of from about 2,000 to about 12,000.

8. The process of claim 5, wherein (a) comprises methyl methacrylate.

9. The process of claim 5, wherein the reaction between (a) and (b) is at temperatures of from about 25° C. to about 250° C. for a time period of from about 1 hour to about 10 hours.

10. A preformed stabilizer comprising the free-radical polymerization product of:
  (A) the ethylenically unsaturated macromer of claim 1, with
  (B) at least one ethylenically unsaturated monomer, in the presence of
(C) at least one free-radical polymerization initiator, and, optionally,
(D) a liquid diluent,
and, optionally,
(E) a chain transfer agent.

11. The preformed stabilizer of claim 10, wherein (A) the ethylenically unsaturated macromer comprises the reaction product of:
(a) a compound corresponding to the formula:

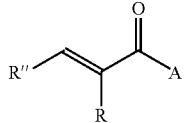

wherein:
R: represents a hydrogen atom, a methyl group, an ethyl group, a propyl group or a butyl group,
R": represents a hydrogen atom, a methyl group, an ethyl group, a propyl group, a butyl group, a phenyl group, an ethenyl group, or a propenyl group,
and
A: represents a chlorine atom, a bromine atom, a iodine atom, or the group OR',
wherein:
R': represents a hydrogen atom, a methyl group or an ethyl group; and
(b) a polyether polyol having a functionality of from about 4 to about 10, an OH number of about 15 to about 200 and a molecular weight of from about 2,000 to about 12,000.

12. The preformed stabilizer of claim 10, wherein (B) said ethylenically unsaturated monomer is selected from the group consisting of acrylonitrile, styrene and mixtures thereof.

13. The preformed stabilizer of claim 12, wherein (B) comprises a mixture of styrene and acrylonitrile in a weight ratio of 80:20 to 40:60.

14. The preformed stabilizer of claim 10, wherein (C) said free-radical initiator is selected from the group consisting of one or more peroxide initiators, one or more azo initiators and mixtures thereof.

15. The preformed stabilizer of claim 10, wherein (D) said diluent is selected from the group consisting of a mono-ol, a polyol, a hydrocarbon, an ether and mixtures thereof.

16. The preformed stabilizer of claim 10, wherein (E) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabrom ide, chloroform, and methylene chloride.

17. A process for the preparation of a preformed stabilizer comprising:
(1) free-radically polymerizing:
(A) the ethylenically unsaturated macromer of claim 1, with
(B) at least one ethylenically unsaturated monomer, in the presence of
(C) at least one free-radical initiator,
and, optionally,
(D) a liquid diluent,
and, optionally,
(E) a chain transfer agent.

18. The process of claim 17, wherein: (A) the ethylenically unsaturated macromer comprises the reaction product of:
(a) a compound corresponding to the formula:

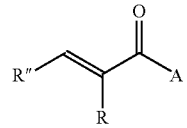

wherein:
R: represents a hydrogen atom, a methyl group, an ethyl group, a propyl group or a butyl group,
R": represents a hydrogen atom, a methyl group, an ethyl group, a propyl group, a butyl group, a phenyl group, an ethenyl group, or a propenyl group,
and
A: represents a chlorine atom, a bromine atom, a iodine atom, or the group OR',
wherein:
R': represents a hydrogen atom, a methyl group or an ethyl group;
and
(b) a polyether polyol having a functionality of from about 4 to about 10, an OH number of about 15 to about 200 and a molecular weight of from about 2,000 to about 12,000.

19. The process of claim 17, wherein (B) said ethylenically unsaturated monomer is selected from the group consisting of acrylonitrile, styrene and mixtures thereof.

20. The process of claim 19, wherein (B) comprises a mixture of styrene and acrylonitrile in a weight ratio of 80:20 to 40:60.

21. The process of claim 17, wherein (C) said free-radical initiator is selected from the group consisting of one or more peroxide initiators, one or more azo initiators and mixtures thereof.

22. The process of claim 17, wherein (D) said diluent is selected from the group consisting of a mono-ol, a polyol, a hydrocarbon, an ether and mixtures thereof.

23. The process of claim 17, wherein (E) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabromide, chloroform, and methylene chloride.

24. A polymer polyol comprising the reaction product of:
(I) a base polyol having an OH number of from 10 to 180and having a
functionality of 2 to 8,
(II) the preformed stabilizer of claim 10, and
(III) at least one ethylenically unsaturated monomer, in the presence of
(IV) at least one free-radical polymerization initiator, and, optionally,
(V) a chain transfer agent.

25. The polymer polyol of claim 24, wherein (III) said ethylenically unsaturated monomer is selected from the group consisting of styrene, acrylonitrile and mixtures thereof.

26. The polymer polyol of claim 25, wherein (III) said ethylenically unsaturated monomer comprises a mixture of styrene and acrylonitrile in a weight ratio of 80:20 to 30:70.

27. The polymer polyol of claim 24, wherein (IV) said free-radical polymerization initiator is selected from the group consisting of acyl peroxides, alkyl peroxides, azo compounds and mixtures thereof.

28. The polymer polyol of claim 24, wherein (V) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabrom ide, chloroform and methylene chloride.

29. A process for the preparation of a polymer polyol comprising:
    (1) free-radically polymerizing:
        (I) a base polyol having an OH number of from 10 to 180 and
            having a functionality of 2 to 8,
        (II) the preformed stabilizer of claim 10, and
        (III) at least one ethylenically unsaturated monomer, in the presence of
        (IV) at least one free-radical polymerization initiator, and, optionally,
        (V) a chain transfer agent.

30. The process of claim 29, wherein (III) said ethylenically unsaturated monomer is selected from the group consisting of styrene, acrylonitrile and mixtures thereof.

31. The process of claim 30 wherein (III) said ethylenically unsaturated monomer comprises a mixture of styrene and acrylonitrile in a weight ratio of 80:20 to 30:70.

32. The process of claim 29, wherein (IV) said free-radical polymerization initiator is selected from the group consisting of acyl peroxides, alkyl peroxides, azo compounds and mixtures thereof.

33. The process of claim 29, wherein (V) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabromide, chloroform and methylene chloride.

34. A polymer polyol comprising the reaction product of:
    (I) a base polyol having an OH number of from 10 to 180 and a
        functionality of 2 to 8,
    (II) the ethylenically unsaturated macromer of claim 1, and
    (III) at least one ethylenically unsaturated monomer, in the presence of:
    (IV) at least one free-radical polymerization initiator, and, optionally,
    (V) a chain transfer agent.

35. The polymer polyol of claim 34, wherein (III) said ethylenically unsaturated monomer is selected from the group consisting of styrene, acrylonitrile and mixtures thereof.

36. The polymer polyol of claim 35, wherein (III) said ethylenically unsaturated monomer comprises a mixture of styrene and acrylonitrile in a weight ratio of 80:20 to 30:70.

37. The polymer polyol of claim 34, wherein (IV) said free-radical polymerization initiator is selected from the group consisting of acyl peroxides, alkyl peroxides, azo compounds and mixtures thereof.

38. The polymer polyol of claim 34, wherein (V) said chain transfer agent is selected from the group consisting of isopropanol, ethanol, tert-butanol, toluene, ethylbenzene, triethylamine, dodecylmercaptan, octadecylmercaptan, carbon tetrach bride, carbon tetrabromid, chloroform and methylene chloride.

39. A process for the preparation of a polymer polyol comprising:
    (1) free-radically polymerizing:
        (I) a base polyol having an OH number of from 10 to 180 and a functionality of 2 to 8,
        (II) the ethylenically unsaturated macromer of claim 1, and
        (III) at least one ethylenically unsaturated monomer, in the presence of:
        (IV) at least one free-radical polymerization initiator, and, optionally,
        (V) a chain transfer agent.

40. The process of claim 39, wherein (III) said ethylenically unsaturated monomer is selected from the group consisting of styrene, acrylonitrile and mixtures thereof.

41. The process of claim 40, wherein (III) said ethylenically unsaturated monomer comprises a mixture of styrene and acrylonitrile in a weight ratio of 80:20 to 30:70.

42. The process of claim 39, wherein (IV) said free-radical polymerization initiator is selected from the group consisting of acyl peroxides, alkyl peroxides, azo compounds and mixtures thereof.

43. The process of claim 39, wherein (V) said chain transfer agent is selected from the group consisting of isopropanol, ethanol, tert-butanol, toluene, ethylbenzene, triethylamine, dodecylmercaptan, octadecylmercaptan, carbon tetrachioride, carbon tetrabromid, chloroform and methylene chloride.

44. A process of preparing a polyurethane comprising reacting (1) a polyisocyanate with (2) an isocyanate-reactive component comprising the polymer polyol of claim 24.

45. A process of preparing a polyurethane comprising reacting (1) a polyisocyanate with (2) an isocyanate-reactive component comprising the polymer polyol of claim 34.

* * * * *